United States Patent [19]

Tsahalis

[11] Patent Number: 4,610,794

[45] Date of Patent: Sep. 9, 1986

[54] HIGH CURRENT DIVERSIONARY OIL-BOOM

[75] Inventor: Demosthenes T. Tsahalis, Houston, Tex.

[73] Assignee: Shell Oil Company, Houston, Tex.

[21] Appl. No.: 468,020

[22] Filed: Feb. 18, 1983

Related U.S. Application Data

[63] Continuation of Ser. No. 196,230, Oct. 14, 1980, abandoned, which is a continuation of Ser. No. 79,687, Sep. 28, 1979, abandoned.

[51] Int. Cl.[4] ............... C02F 1/40; E02B 15/04
[52] U.S. Cl. ............... 210/776; 210/242.3; 210/923; 405/63
[58] Field of Search ............... 405/63–73; 210/242.1, 242.3, 923, 776

[56] References Cited

U.S. PATENT DOCUMENTS 3,771,662 7/1973 Muramatsu et al. ............... 210/923
3,886,750 6/1975 Ayers ............... 405/72
4,096,700 6/1978 Muramatsu et al. ............... 405/63

Primary Examiner—Benoit Castel

[57] ABSTRACT

A skimmer-boom apparatus for skimming and diverting floating pollutants, such as oil, from the surface of water experiencing high current velocity comprising an upstream and a downstream buoyant member connected by an impermeable membrane. The buoyant members are coupled at one end and open at the other, resulting in a "V" shaped structure. The upstream member is disposed to skim oil or other floating pollutants between it and the upstream edge of the membrane. The cross-sectional area of the skimmer-boom as defined by the membrane and the buoyant members increases in the direction of the open end of the "V" in order to maintain constant mean flow velocity of the skimmed water and pollutant contained within the apparatus as it flows towards a collection area from the narrow, closed end to the open end of the structure. Oil thereby collected may be skimmed or otherwise removed from the capture area.

5 Claims, 9 Drawing Figures

HIGH CURRENT DIVERSIONARY OIL-BOOM

This is a continuation, of application Ser. No. 196,230, filed Oct. 14, 1980, which is a continuation of application Ser. No. 79,687, filed Sept. 28, 1979, both now abandoned.

BACKGROUND OF THE INVENTION

This invention relates to a skimmer-boom apparatus for skimming and diverting a floating liquid pollutant such as oil from a body of water.

Historically, the most effective way of controlling the movement of a liquid pollutant which is spilled on a body of water and which floats on the surface thereof, has been to use floating barriers, commonly referred to as booms, to confine the pollutant to a collection area. A boom is generally a floating, elongated mechanical device used to divert or stop the flow of a floating liquid pollutant. Devices presently on the market suffer from several failure mechanisms, a number of which follow: Underflow caused by currents or waves carries the pollutant outside of the collection area. Splashover, caused by waves, carries the pollutant over the boom device and outside the collection area. Mechanical failure of the structural members or joints of conventional boom devices causes complete loss of control of the pollutant. Anchoring and positioning problems may be encountered when fixing the booms in place to cause inefficient collection of the pollutant.

Generally, booms may be classified into containment devices and diversionary devices. Either class of booms may be anchored in a body of water or towed through a body of water, but both become ineffective in controlling the movement of pollutants when the relative velocity of the water with respect to the boom exceeds approximately one knot for containment devices and two knots for diversionary devices. Since currents in excess of one or two knots are frequently encountered and skimmers are being designed to operate in currents up to ten knots, the need for a pollutant collection device which will be effective in currents in excess of two knots is obvious.

Numerous oil collecting and containing devices appear in the prior art. U.S. Pat. No. 3,650,406 issued to Brown et al describes a collect in system having a floating weir as one section and a boom as another section. A flexible sheet, in combination with the two aforementioned sections, forms a catch basin for collecting the oil. This system is adapted for towing through a body of water. U.S. Pat. No. 3,886,750, issued to Ayers et al describes an oil-containment apparatus for use in water experiencing high current velocities. An upstream and downstream barrier connected with a partially permeable membrane define a capture area such that flow velocity therein is reduced. This allows oil to float to the surface to enable collection devices to remove the oil from the capture area. Flow velocity is reduced by using a membrane of sufficient permeability such that flow out of the capture area is less than the volume of water approaching the inlet. Water is deflected beneath the collection device as the velocity of flow at the inlet increases. However, a certain amount of oil floating atop the water would necessarily be carried underneath the device with the diverted flow, the amount of oil increasing with the velocity of flow. U.S. Pat. No. 4,096,700, issued to Muramatsu et al describes a device similar to the Ayers device in that an upstream and a downstream barrier are connected together by a perforated, flexible sheet. The oil flows into the containment apparatus through inlet openings in the upstream barrier and a plurality of outlet openings are arranged in the flexible sheet such that the outlet area is greater than the inlet area. A guide plate made integral with the flexible sheet serves to guide the film of oil into the inlet openings. The ratio of the inlet opening area to the outlet opening area is chosen to eliminate turbulence within the collection area. However, since flow is allowed to escape from the device through the outlet openings, a certain amount of oil will be carried into the device and out of the outlet openings with the water, the amount increasing with the velocity of flow-through. In other words, instead of losing oil beneath the device as in Ayers, oil is lost through the underwater outlet of the Muramatsu device. In addition, since the guide plate will be fixed in relation to the upstream barrier as an integral part of the flexible sheet, if the oil film is a greater thickness than the distance from the water surface to the guide plate, a portion of the oil film will be deflected beneath the Muramatsu device. Because of their velocity sensitivity, the efficiency of the prior art devices tends to decrease drastically as the velocity of flow-through increases.

SUMMARY OF THE INVENTION

The apparatus of the invention relates to a combination skimmer-boom device for use in water experiencing high current velocity comprising at least two buoyant members, one buoyant member being located upstream of the other with respect to the current velocity. The buoyant members converge to a connecting point at one end and diverge at the other end, resulting in a generally "V" shaped structure. A membrane is disposed between the upstream and downstream buoyant members to provide a capture volume. The upstream buoyant member is provided with openings between it and the membrane for allowing a floating pollutant to enter into the space defined by the buoyant members. The buoyant members in combination with the membrane connected therebetween define a cross sectional area which increases in the direction of the diverging end of the "V" shaped structure. This increasing cross section has the effect of maintaining constant mean flow velocity of the water and pollutant contained within the apparatus, or skimmer-boom as it is diverted in the direction of the diverging end of the structure. Oil or other pollutant collected therein may be removed therefrom by conventional means or skimming devices.

The apparatus will function equally well in any body of liquid wherein the pollutant on the surface thereof has a lesser density than the body of liquid.

In the method of the invention, two buoyant members are coupled at one end and open at the other resulting in a "V" shaped structure. A membrane is provided between the buoyant members and with the buoyant members defines a capture volume in the form of a flume with a cross-sectional area which increases from the closed end to the open end. The floating pollutant is diverted beneath the upstream buoyant member and into the capture area by maintaining a current velocity relative to the buoyant members. The velocity may be maintained by the flow of the water itself, by moving the apparatus relative to the standing body of water, or by a combination of these. The increasing cross-sectional area serves to maintain a constant mean flow velocity which is directed generally transverse to the relative velocity of the water with respect to the apparatus, being diverted in that direction by the buoyant members in combination with the membrane. The total effect of the diverted flow and the increasing cross-sectional area causes an increasingly larger thickness of the liquid pollutant to collect as the flow progresses to the open end of the apparatus.

BRIEF DESCRIPTION OF THE DRAWINGS

Advantages of the method and apparatus of the invention will become apparent with reference to the detailed description in combination with the drawings, in which.

DETAILED DESCRIPTION OF THE INVENTION

Figure 1:
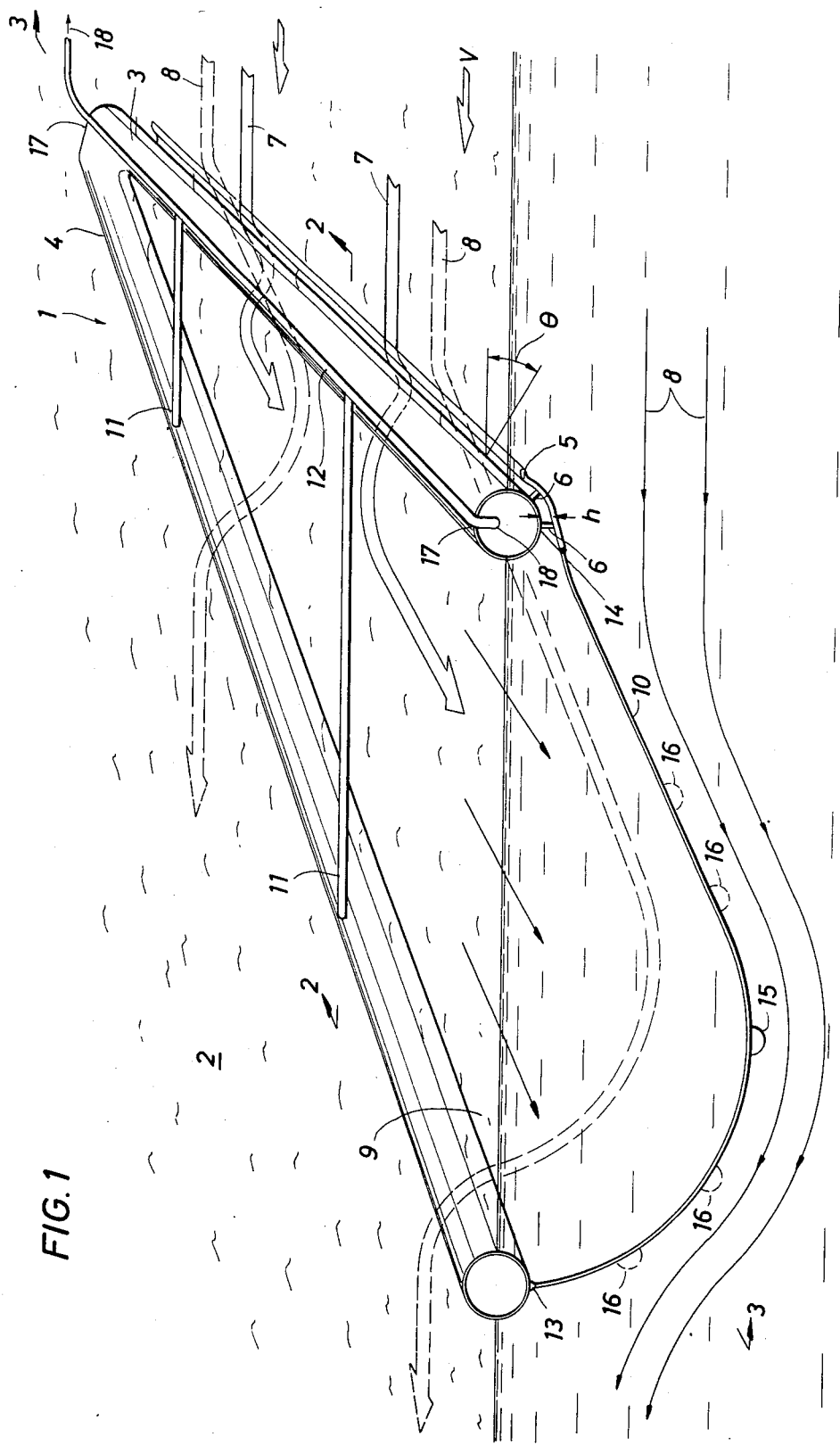
FIG. 1 represents a view of the skimmer-boom device in operation.

The principle of the invention involves skimming and diverting the floating material or pollutant to be collected within a capture area where the turbulence, the velocity and the direction of the flow can be controlled. The skimmer-boom device is placed at an angle with respect to the direction of the water flow and takes a parabolic shape as dictated by the pressure forces exerted by the flowing water on the upstream buoyant member and the membrane. Because of the diverging buoyant members and increasing cross-section a constant mean flow velocity is achieved that gives the pollutant an opportunity to float to the surface of the water and allows a thicker layer of pollutant to form in the direction of the diverging end, facilitating the collection of the pollutant.

The buoyant members are not confined to single, integral members nor are they confined to cross sections of an oval or cylindrical nature. In fact, it may be particularly useful to provide a number of discrete buoyant sections connected in a longitudinal arrangement for ease of handling and placement and increased utility. By using sectional buoyant members, pollutants could be collected from very large bodies of water using a single skimmer-boom device. The cross sectional shape of the downstream buoyant member (or members, if sectional) may be any shape whatever, so long as the requisite buoyancy is maintained and the member projects a sufficient distance above the water surface to confine the pollutant. The upstream buoyant member cross section may likewise take any of various shapes, such as circular, oval, triangular or square, so long as the buoyancy allows the member to project above the water surface the requisite distance and the underside of the member is streamlined such that flow of the pollutant beneath the member will take place with minimum turbulence or disruption.

The means for maintaining the angle between the buoyant members may be rigid bars or rods, or flexible ropes, chains or cables. Their number and frequency and placement will be dependent on such things as the relative operational velocity, the number of sectional buoyant members utilized, the longitudinal rigidity of the buoyant members, and the degree of necessity for maintaining an angle between the members within close tolerances. If flexible means are used for maintaining the angle, a relative velocity established between the skimmer-boom device and the body of water will cause the angle to be maintained at its maximum via the force of the flow into the device. If rigid members are used, the angle would be maintained regardless of flow velocity. It is not necessary that the divergence angle between the buoyant members be constant, but only that the structure of the device as a whole exhibits divergence from one end to the other. Although it is preferred to have the buoyant members attached at the converging end, the skimmer-boom device will also function where the members converge without connecting, although efficiency of pollutant collection will be impaired if no provision is made to prevent escape at the converging end.

The opening through which the pollutant flows, which will be located beneath the upstream buoyant member, will ordinarily extend the entire length of the member. However, it may be desirable to provide an opening along only a portion of the upstream member. In addition, the opening need not be continuous but may be a series of discontinuous openings. Just as the buoyant members may be sectional, the guide plate which defines the opening may be sectional for the reasons mentioned above applicable to the sectional buoyant members. The guide plate may be fixedly attached to the upstream buoyant member in any way, but it is desirable to use rods or similar connecting devices to maximize the available inflow area. By maximizing the inflow area, the skimmer-boom device will be rendered less susceptible to failure due to obstruction from solid debris.

The membrane disposed between the buoyant members is connected directly to the downstream buoyant member in such a manner as to prevent any outflow of the skimmed water and polutant, but it is connected to the upstream buoyant member via the guide plate which is attached directly to the upstream member. The membrane may be of any flexible material which is impermeable to the water and the liquid pollutant being collected. However, if solids are being collected with the skimmer-boom device, it is not necessary that the membrane be impermeable to the water, but it is necessary that the membrane provides a minimum resistance to the flow of water so that diversion of flow of the skimmed water and solid pollutant will occur and the requisite parabolic shape of the membrane will be maintained. Of course, the flexible material must be resistant to destruction by the oil or other pollutant being collected as well as the liquid on which the pollutant is floating.

The cross sectional area as defined by the divergent buoyant members and the membrane disposed therebetween ordinarily will increase constantly as opposed to increasing in a number of discrete steps, but it is recognized that such discrete increases may function equally well, so long as the trend from the converging end to the diverging end of the buoyant member is one of increasing cross section. The constantly increasing cross section will be more advantageous, however, because of the decreased possibility of turbulence within the capture volume.

Ballast may be attached to the membrane of the skimmer-boom device in order to maximize capture volume while maintaining a well streamlined profile during operation of the device. The ballast may be any material which has a density greater than that of the body of liquid in which the skimmer-boom device is placed, and it has been particularly advantageous to use solid metal rods or chains placed generally along the length of the skimmer-boom device and attached to the membrane at its center, between the buoyant members. The ballast may be attached to the inner side or outer side of the membrane; each will function equally well. Obviously, the ballast may be placed at any location along the membrane where it becomes advantageous to maintain the proper profile, and it will be necessary to consider the density of the membrane itself and the relative flow velocities involved to determine proper placement. Maintaining the streamlined profile of the skimmer-boom device will facilitate flow of water beneath the device.

A prototype of the skimmer-boom device was tested in a current tank for water velocities up to 2.5 feet per second. The prototype performed as expected and skimmed and diverted 100% of oil floating on the surface of the water.

Referring now to FIG. 1, an embodiment of skimmer-boom device 1 is shown in a body of water 2. The device comprises upstream buoyant member 3 and downstream buoyant member 4 arranged in a "V" shaped configuration, each of the buoyant members being partially submerged in a body of water 2. Members 3 and 4 may be rigid along their length or flexible. For instance, if particularly turbulent conditions are encountered in body of water 2, it may be advantageous to provide for more flexibility in the buoyant members. Or, due to the skimming function of member 3 which is described below, it may be advantageous to provide more rigidity for member 3 than for member 4 so that it will provide proper support for guide plate 5. Inflow guide plate 5 is fixedly attached by rods 6 at a distance "H" beneath the water surface so that member 3 and guide plate 5 co-act to skim a surface layer of water of thickness "H" and direct flow 7 into capture volume 9. Membrane 10 confines flow 7 within capture volume 9 and, in conjunction with buoyant members 3 and 4, diverts flow 7 in the direction of the diverging end of skimmer-boom device 1. Positioning means or cables 11 are attached to upstream and downstream buoyant members 3 and 4 to retain the generally "V" shaped structure of the device. To obtain the proper channeling effect and to provide an efficient collection point at the diverging end of the device, it has been found helpful to maintain an acute angle, less than 90°, between the buoyant members, although the device will function at angles greater than this. Membrane 10 is attached at 13 to downstream buoyant member 4 so as to prevent flow 7 from escaping beneath member 4. The membrane need not be attached to the underside of member 4, although attachment at this point helps to maintain member 4 in its proper position with respect to member 3, and prevents it from rolling about its own axis. At its upstream edge, membrane 10 is attached to guide plate 5 to prevent skimmed flow 7 from escaping from capture volume 9. Ballast 15 is attached to membrane 10 to maintain a streamlined profile of membrane 10 with respect to the flow of water beneath skimmer-boom device 1, and ballast 16 may also be attached at various positions along the membrane. Although the ballast is shown attached to the outside of member 10, it will function equally well if mounted on the inner side. To provide towing capability or to facilitate anchoring in a body of water, flotation cuff 12 may be provided which may be mounted along member 3 and towing cables 18. The flotation cuff rather than member 3 will take the stress encountered in towing or moving the skimmer-boom device. Alternatively, if member 3 is rigid, towing cables 18 may be attached at points 17, for instance by hooks, to facilitate towing or moving the device.

Figure 2:
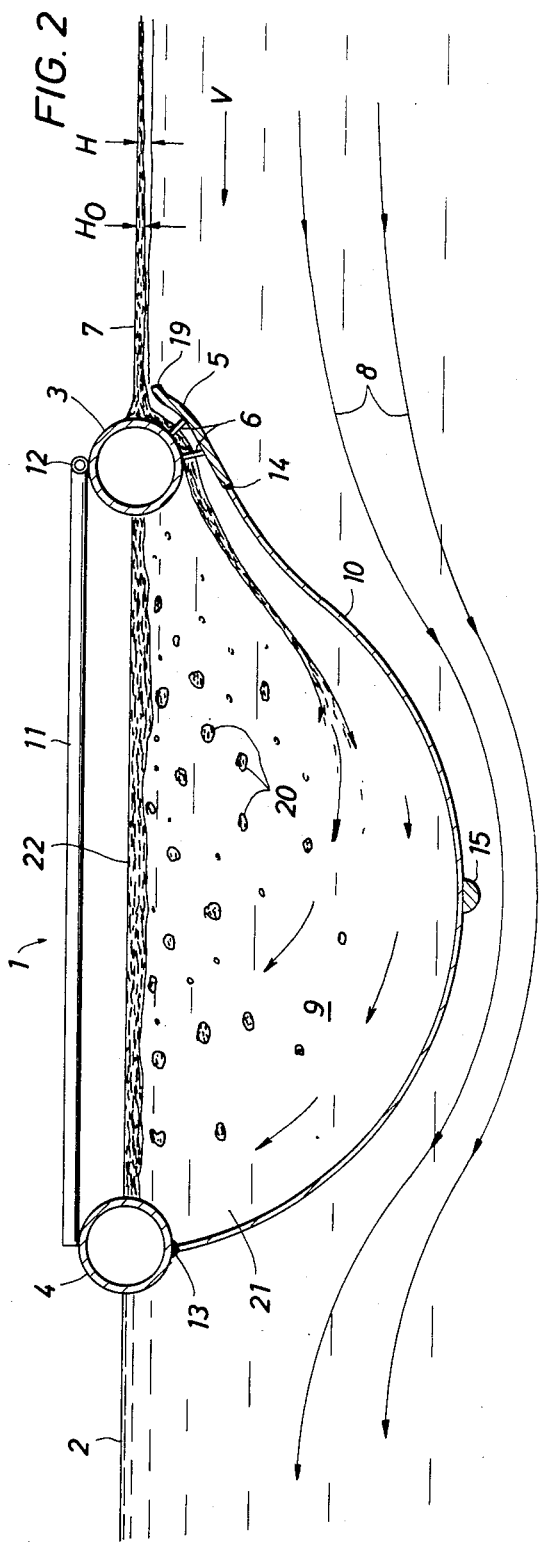
FIG. 2 represents a cross section of the skimmer-boom device taken along lines 2—2 of FIG. 1.
Figure 3:
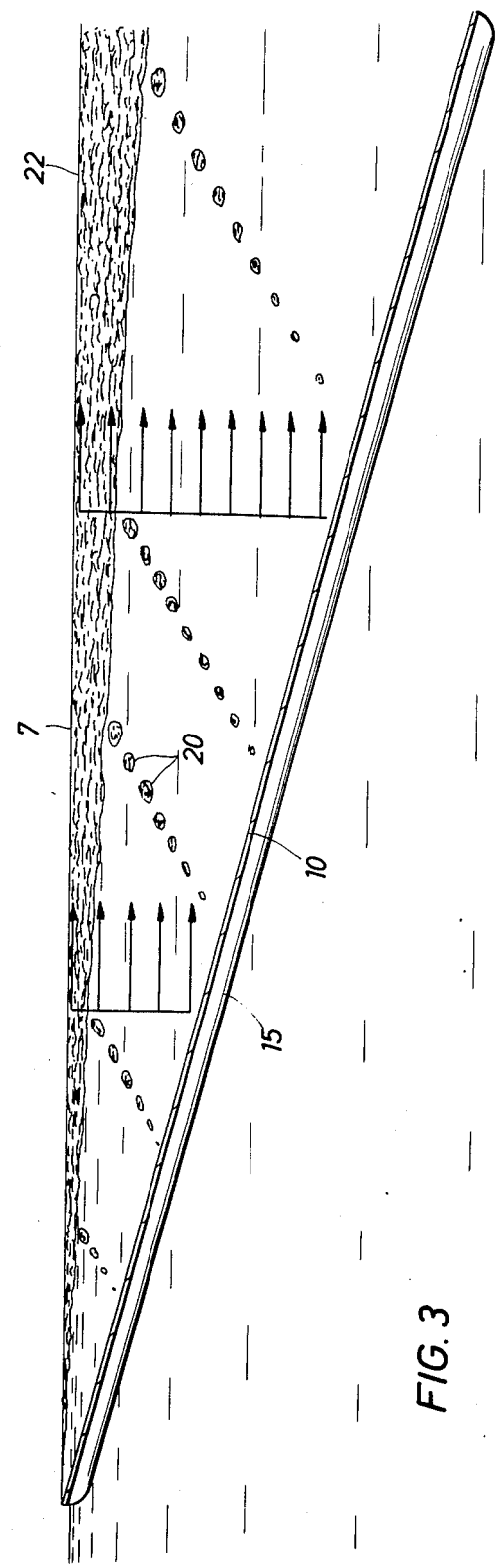
FIG. 3 represents a cross section of the skimmer-boom device taken along lines 3—3 of FIG. 1.

In the following description of the operation of the device, FIGS. 2 and 3 will be referenced and components shown in FIG. 1 are given like numbers in FIGS. 2 and 3. Referring to FIG. 2, relative velocity "V" which may or may not be constant is maintained between body of water 2 and skimmer-boom 1, either by towing the device, movement of body of water 2, or a combination of these. Flow 7, which may contain a thickness "$H_o$" of a pollutant or oil enters capture volume 9 through the opening formed by member 3 and guide plate 5. Guide plate 5 is fixedly attached by rods 6 to member 3 so that its frontal edge is positioned below the surface of water body 2 some distance "H" slightly larger than oil thickness "$H_o$".

Figure 7C:
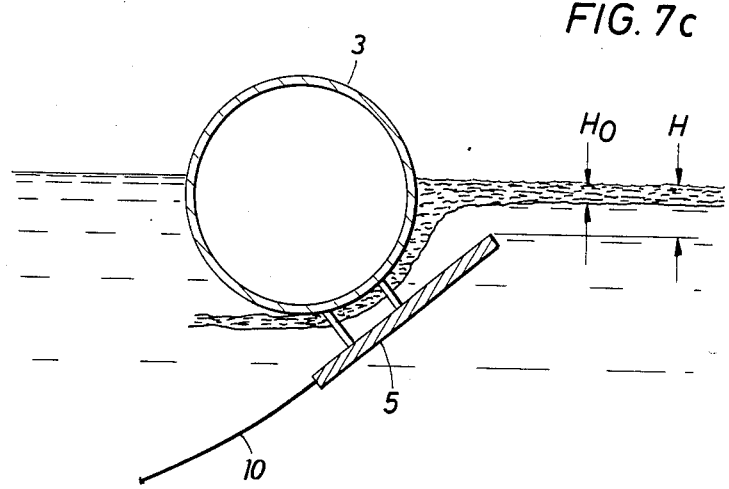
FIGS. 7a, 7b and 7c represent alternative embodiments of the guide plate.
Figure 7B:
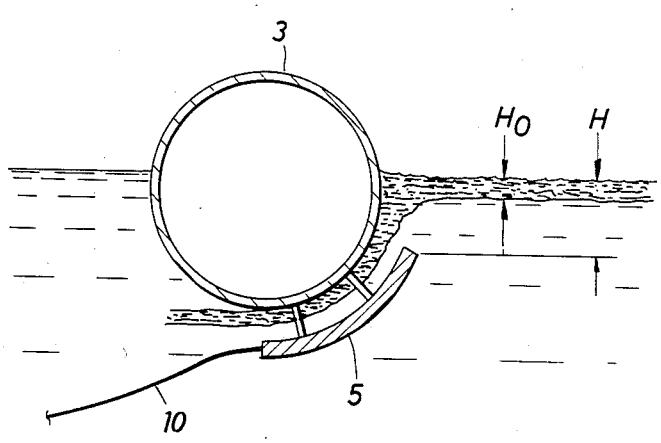
Figure 7A:
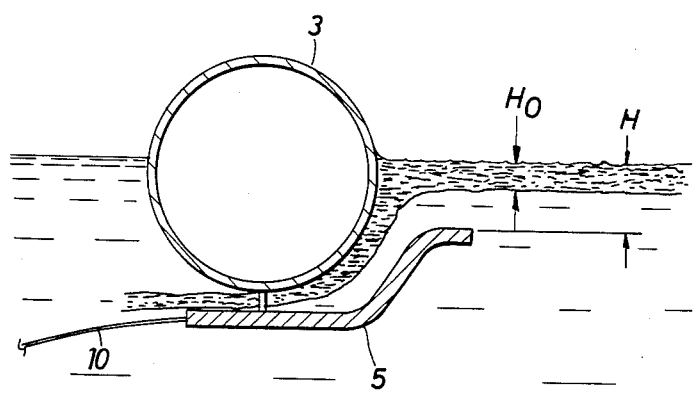

It is advantageous to provide a guide plate whose profile is "S" shaped as shown in FIG. 7(a). The upstream edge of guide plate 5 is positioned horizontal to the water surface a distance "H" below the surface, and the contour of the rest of the guide plate conforms to the contour of the submerged section of member 3 to offer as little resistance as possible to flow 7. The skimmer-boom device will also function, albeit at lower efficiency, if the horizontal portion of guide plate 5 is eliminated, resulting in a guide plate profile as shown in FIG. 7(b) whose upper surface is at all points equidistant from the adjacent surface of member 3, or if guide plate 5 is directed in an upward direction at an acute angle to the water surface, as shown in FIG. 7(c).

Channeling the flow between guide plate 5 and buoyant member 3 diverts the flow downward into the capture volume so that as the flow progresses toward the diverging end of skimmer-boom 1, flow 7 changes its velocity and orientation. If this downward channeling effect was not present, the requisite constant mean flow velocity within the capture volume may not be maintained since a surface layer of flow might move at a different velocity than a subsurface layer of flow. Another effect of orienting the guide plate 5 so that its frontal, upstream edge is projected as in FIG. 2 or FIGS. 7(a), (b) or (c) is that the flow from body of water 2 is divided by the frontal edge, one portion of the flow entering the skimmer-boom device in a downward direction and one portion being diverted downwardly beneath the device as flow 8.

Although rods 6 are rigid, it may be desirable to allow their adjustment to vary distance "H" such as by providing for telescoping of rods 6. As flow 7 enters capture volume 9, oil droplets 20 break out and begin floating to the surface. Since the skimmer-boom 1 is oriented generally transverse to the direction of relative velocity "V", flow 7 changes orientation and flows toward the diverging end of the skimmer-boom. Because of the profile of capture volume 9 defined by membrane 10, the flow is also aligned in the direction of increasing cross section, as indicated in FIG. 3. This causes pressure forces to be applied to membrane 10 from the inner side. These forces have a two-fold effect: Buoyant member 4 is pushed downstream and takes its proper position with respect to buoyant member 3 as determined by positioning cables 11. In addition, in combination with ballast 15, the forces cause membrane 10 to take the streamlined shape shown in FIG. 2 which offers the least resistance to flow 8 beneath the membrane.

The transverse cross section 21 as shown in FIG. 2 increases in the direction of diverted flow to accommodate the additional volume of oil and water that enters the skimmer-boom along its length. The rate of increase of cross sectional area 21 is determined by the requirement that the mean velocity through every cross section is constant. This condition guarantees that there is no pressure increase in the direction of the diverted flow which could choke the flow. Any turbulence within capture volume 9 is thereby greatly reduced. Since the flow is diverted towards the diverging end of skimmer-boom 1 and the volume within capture volume 9 increases in this direction, the oil droplets 20 will rise to the surface at some point downstream of their entrance as shown in FIG. 3. This results in the formation of oil film 22 on the surface of the water between members 3 and 4 which moves with the same velocity as the diverted flow 7.

Because of the volumetric configuration, the thickness of oil film 22 increases in the direction of flow (toward the diverging end) due to collection of additional oil in that direction by the opening between member 3 and guide plate 5. This thicker oil film facilitates the recovery of the oil by conventional devices, such as pumping and storage means.

Figure 6:
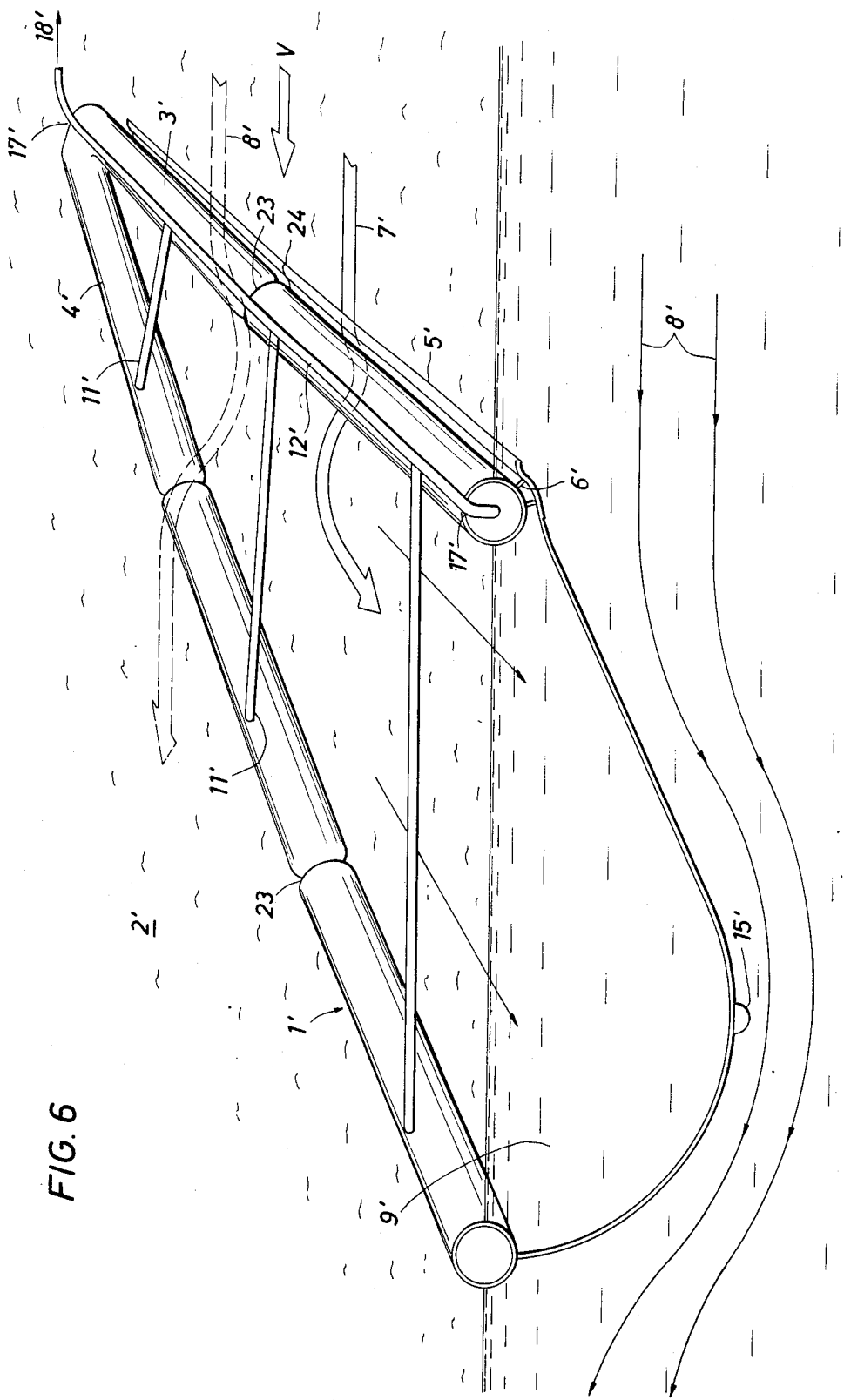
FIG. 6 represents a view of the skimmer-boom device utilizing sectional buoyant members and a sectional guide plate.

As mentioned earlier, it may be advantageous to provide sectional buoyant members rather than single integral buoyant members. Referring to FIG. 6, an alternative embodiment of the skimmer-boom device 1 of FIG. 1 is illustrated as skimmer-boom 1'. This more flexible structure may be particularly useful where especially high velocities or turbulence may be present, in order to prevent structural failure which would occur with a more rigid device. Sectional buoyant members 4' may be flexibly attached at points 23 as shown in FIG. 6, in such a manner that flow 7 is not allowed to escape beneath or between the sectional members. In like manner, guide plate 5' may be divided into sections and flexibly or hingedly attached at joints 24. Although it may be desirable, it is not essential that joints 24 prevent any flow between the sections of guide plate 5', since it may be necessary for added flexibility to allow a small clearance therebetween. In the embodiment of FIG. 6, flotation cuff 12' will ordinarily provide sufficient rigidity to maintain the essential shape of skimmer-boom 1. Positioning means 11 will then allow buoyant member 4 to assume its position as determined by flow velocity "V".

Figure 4:
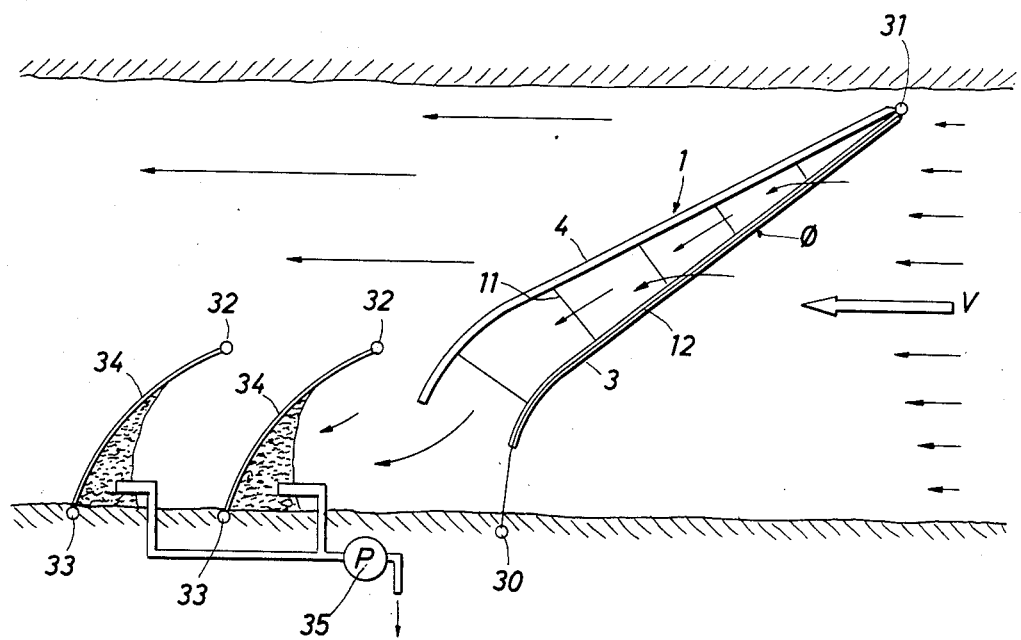
FIG. 4 represents one embodiment of the invention for use in a flowing body of water.

Referring now to FIG. 4, skimmer-boom 1 is shown positioned in a flowing body of water containing floating pollutant, anchored in place transverse to the flow by conventional anchoring means at points 30 and 31. Buoyant member 4 is forced to its position at some acute angle from member 3 by flow of velocity "V" and by positioning means 11. Flow enters beneath member 3 and is diverted from the converging end of the device to its diverging end where the thicker pollutant film is directed into conventional booms 34. As the pollutant is collected by booms 34, pumping means 35 are used to transfer the pollutant from the body of water to storage or disposal facilities.

It can be seen that, because of the geometry of skimmer-boom 1, the amount of pollutant collected and diverted into boom 34 is substantial since none of the pollutant is allowed to escape beneath or through skimmer-boom. The operational principle of the skimmer-boom 1 dictates that the converging end of skimmer-boom 1 be positioned at some point upstream of its diverging end. However, it is recognized that the more upstream the converging end is placed, the less diversion of flow will take place. Hence, opportunity for the pollutant to float to the surface is lessened. Therefore, this factor must be considered when anchoring skimmer-boom 1 transverse to the flow in a flowing body of water.

Figure 5:
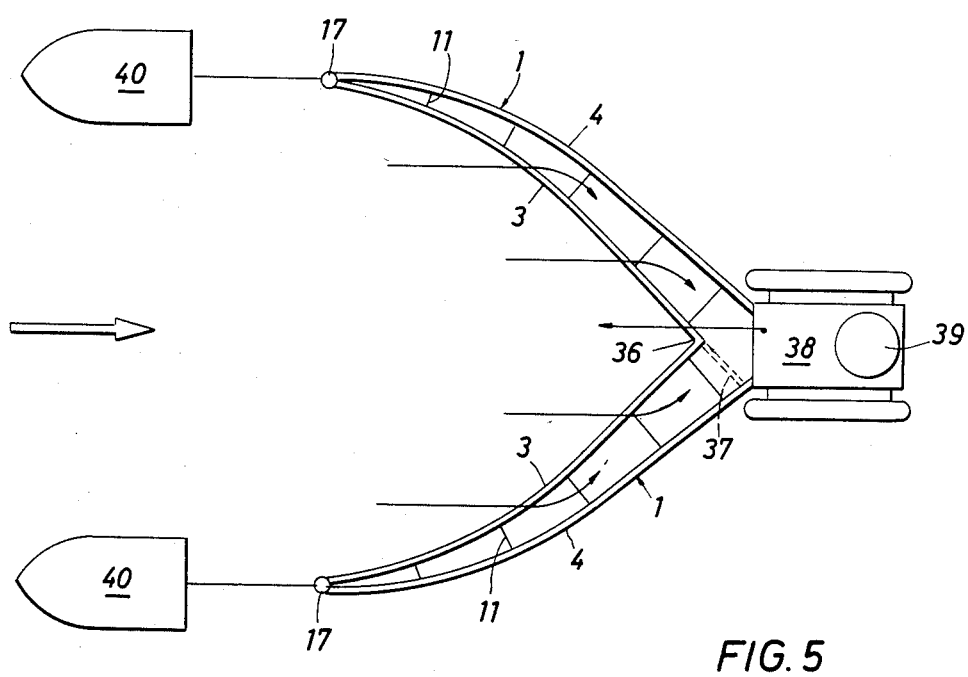
FIG. 5 represents another embodiment of the invention for use in a quiescent or flowing body of water in combination with a conventional skimming device.

A second utilization of the apparatus of the invention is illustrated in FIG. 5, wherein skimmer-boom device 1 is shown located in a body of water containing a floating pollutant. A velocity "V" is established relative to the water surface so that the pollutant may be diverted into skimmer-boom 1 as hereinbefore described. A single skimmer-boom 1 may be attached to conventional skimming device 38 such that the diverging end of skimmer-boom 1 is directed to the inlet of skimming device 38. Skimming device 38 may be any of several available skimmers, such as that described in U.S. Pat. No. 3,966,614, issued to Ayers. Towing means 40 may be attached to skimmer-boom 1 via towing points 17. Of course, it is understood that if the body of water is flowing at some velocity "V", it may not be necessary to tow the structure of FIG. 5, and anchoring the structure in the body of water would suffice. Skimmer 38 may be towed by means of its connection to skimmer-boom 1 or may have independent towing means attached directly to skimmer 38. As the pollutant from the body of water is directed into skimming device 38, it may be collected in storage tanks 39 or transferred to other collection points. As indicated by dashed lines 37, a single skimmer-boom device may be used in conjunction with skimmer 38 or a second skimmer-boom may be attached such that the collection areas of the skimmer-boom devices 1 are located adjacent the inlet of skimmer 38. In this manner, a greater amount of pollutant may be collected in the same period of time.

It will be understood that various modifications of this method and apparatus for collecting a floating pollutant may occur to those skilled in the art, and it is intended that this invention be limited only by the scope of the appended claims.

What is claimed is:

1. Apparatus for skimming and diverting a floating liquid pollutant on a water surface wherein a relative current velocity is established between said apparatus and said water surface, said relative velocity establishing flow from a direction upstream to downstream of said apparatus, comprising;

a boom formed by at least two spaced apart buoyant members;

a substantially water and pollutant impermeable membrane disposed between and connecting said spaced apart buoyant members, said membrane defining a capture volume for diverting said pollutant to a common collection area, said membrane being disposed so as to define an increasing cross-sectional area of said capture volume in the direction of said collection area; and, an opening between one buoyant member and said membrane for skimming said pollutant.

2. Method for skimming and diverting a floating liquid pollutant on a water surface, comprising:
providing at least two buoyant members spaced apart and describing a capture area;
providing a substantially water and pollutant impermeable membrane disposed between said buoyant members defining a capture volume which has an increasing cross-sectional area in the direction of said open end, said capture volume directing said pollutant to a collection area;
directing said pollutant into said capture area by maintaining a current velocity relative to said buoyant members; and,
maintaining a constant mean flow velocity throughout said capture volume such that an increasingly larger thickness of said pollutant collects within said capture volume in the direction of said collection area.

3. Apparatus for removing a floating liquid pollutant from a flowing water stream comprising:
means for skimming a major portion of the pollutant and a minor portion of the water from the surface of the stream;
means for diverting substantially all of the skimmed pollutant and water into a channel cross-flowing the stream to a remote area, said diverting means comprising a boom formed by at least two spaced apart buoyant members connected by a substantially water and pollutant impermeable membrane; and
means for separating the pollutant from the water in the remote area with reduced risk of pollutant loss into the stream.

4. The apparatus of claim 3 wherein the skimming means comprises an opening between one buoyant member and the membrane.

5. The apparatus of claim 4 including an approximately S-shaped inflow guide defining the bottom side of the opening between the buoyant member and the membrane.

* * * * *